(12) United States Patent  (10) Patent No.: US 8,665,090 B2
Bull  (45) Date of Patent: Mar. 4, 2014

(54) MULTI-MODAL LOAD CONTROL SYSTEM HAVING OCCUPANCY SENSING

(75) Inventor: John H. Bull, Coplay, PA (US)

(73) Assignee: Lutron Electronics Co., Inc., Coopersburg, PA (US)

(*) Notice: Subject to any disclaimer, the term of this patent is extended or adjusted under 35 U.S.C. 154(b) by 543 days.

(21) Appl. No.: 12/686,634

(22) Filed: Jan. 13, 2010

(65) Prior Publication Data

US 2010/0188009 A1 Jul. 29, 2010

Related U.S. Application Data

(60) Provisional application No. 61/147,325, filed on Jan. 26, 2009.

(51) Int. Cl.
*G08B 1/08* (2006.01)

(52) U.S. Cl.
USPC ...... 340/539.26; 340/540; 340/541; 340/561; 340/565

(58) Field of Classification Search
USPC ............ 340/539.26, 540, 541, 561, 565, 566, 340/567; 315/291, 307–311, 149–159
See application file for complete search history.

(56) References Cited

U.S. PATENT DOCUMENTS

| 4,889,999 | A | 12/1989 | Rowen |
| 5,357,170 | A | 10/1994 | Luchaco et al. |
| 6,225,760 | B1 | 5/2001 | Moan |
| 6,528,957 | B1 | 3/2003 | Luchaco |
| 7,111,952 | B2 | 9/2006 | Veskovic |
| 7,369,060 | B2 | 5/2008 | Veskovic et al. |
| 7,391,297 | B2 | 6/2008 | Cash et al. |
| 7,619,539 | B2 | 11/2009 | Veskovic et al. |

(Continued)

FOREIGN PATENT DOCUMENTS

| EP | 1538579 | 6/2005 |
| GB | 2351149 | 12/2000 |

OTHER PUBLICATIONS

European Patent Office, International Search Report and Written Opinion for International Patent Application No. PCT/US2010/021617, Dec. 7, 2010, 10 pages.

(Continued)

*Primary Examiner* — Tuyet Thi Vo
(74) *Attorney, Agent, or Firm* — Condo Roccia LLP

(57) ABSTRACT

A multi-modal load control system includes a sensor that operates as an occupancy sensor in a first mode of operation and operates as a vacancy sensor in a second mode of operation. The load control system comprises a load control circuit adapted to be coupled in series electrical connection between an AC power source and an electrical load for controlling the amount of power delivered to the load in response to sensor, which is operable to detect occupancy or vacancy conditions in a space in which the sensor is located. In the first mode of operation, the load control circuit turns the load on when the sensor detects the occupancy condition and turns the load off when the sensor detects the vacancy condition. In the second mode of operation, the load control circuit turns the load off when the sensor detects the vacancy condition and does not turn the load on when the sensor detects the occupancy condition.

20 Claims, 10 Drawing Sheets

(56) References Cited

U.S. PATENT DOCUMENTS

| | | |
|---|---|---|
| 2002/0135476 A1 | 9/2002 | McKinney et al. |
| 2007/0273307 A1 | 11/2007 | Westrick et al. |
| 2008/0088180 A1 | 4/2008 | Cash et al. |
| 2008/0092075 A1 | 4/2008 | Jacob et al. |
| 2010/0052574 A1* | 3/2010 | Blakeley et al. .............. 315/307 |
| 2010/0052576 A1 | 3/2010 | Steiner et al. |
| 2010/0052894 A1 | 3/2010 | Steiner et al. |

OTHER PUBLICATIONS

Lutron Electronics Co., Inc., Application Note #139: Afterhours Mode, Sep. 2006, 4 pages.

Lutron Electronics Co., Inc., Softswitch128 Switching System Setup and Maintenance Guide, Oct. 7, 2004, 56 pages.

International Patent Application No. PCT/US2010/021617: International Preliminary Report on Patentability dated May 31, 2011, 18 pages.

* cited by examiner

MULTI-MODAL LOAD CONTROL SYSTEM HAVING OCCUPANCY SENSING

CROSS-REFERENCE TO RELATED APPLICATIONS

This application is a non-provisional application of commonly-assigned U.S. Provisional Application Ser. No. 61/147,325, filed Jan. 26, 2009, entitled LIGHTING CONTROL SYSTEM HAVING AN IMPROVED AFTERHOURS MODE, the entire disclosure of which is hereby incorporated by reference.

BACKGROUND OF THE INVENTION

1. Field of the Invention

The present invention relates to a load control system comprising a plurality of load control devices for controlling the amount of power delivered to a plurality of electrical loads from an alternating-current (AC) power source, and more particularly, to a lighting control system, which has sensors for detecting the presence and absence of an occupant and automatically changes between two modes of operation.

2. Description of the Related Art

Typical prior art load control systems are operable to control the amount of power delivered to an electrical load, such as, a lighting load or a motor load, from an alternating-current (AC) power source. A lighting control system generally comprises a plurality of control devices coupled to a communication link to allow for communication between the control devices. The control devices of a lighting control system include lighting control devices (e.g., dimmer circuits, electronic ballasts, or light-emitting diode drivers) operable to control the amount of power delivered to the lighting loads (and thus, the intensity of the lighting loads) in response to digital messages received across the communication link. In addition, the control devices of a lighting control system often include one or more keypad devices that transmit commands across the communication link in order to control the loads coupled to the lighting control devices.

In order to conserve energy, some prior art lighting control systems for commercial buildings provide an "afterhours" mode, which may be activated during hours when a building is typically not occupied, for example, during "non-work" hours, such as, from 6 P.M. to 7 A.M. When operating in the afterhours mode, the lighting control system turns off the lighting loads in most workspace areas of the building to save energy. Only a minimum number of lighting loads (such as, emergency or safety lighting) is typically illuminated in the building during afterhours mode. If an employee needs to occupy one or more of the workspace areas, the employee may use a manual control, such as, actuating a button of a keypad device, to turn on all of the lights in the workspace area. To ensure that the lights do not stay on for longer than required, the lighting control system turns the lights off (except for the emergency or safety lighting) after a predetermined amount of time from when the lights were turned on (e.g., one hour). Before turning off the lights (e.g. a short period of time before turning off the lights, such as, five minutes), the lighting control system blinks the lights in the workspace area to alert the employee that the lights will be turning off soon. The employee may then manually actuate a button of the keypad to cause the lights to stay on for another hour. The requirement to manually actuate the buttons of the keypad to keep the lights on is undesirable since this action may be disruptive to the employee.

To provide energy savings, some lighting control systems have included occupancy or vacancy sensors, which are used to detect occupancy or vacancy conditions in the area around the sensor to thus control the lighting loads of the lighting control system. An occupancy sensor typically operates to turn on lighting loads when the occupancy sensor detects the presence of an occupant in the space (i.e., an occupancy event) and then to turn off lighting loads when the occupancy sensor detects that the occupant has left the space (i.e., a vacancy event). A vacancy sensor only operates to turn off lighting loads when the vacancy sensor detects a vacancy condition in the space. Therefore, when using a vacancy sensor, the lighting loads must be turned on manually (e.g., in response to an actuation of a button of a keypad). In prior art lighting control systems, each sensor has been configured as either an occupancy sensor or a vacancy sensor. Typically, the sensors are configured as occupancy sensors during normal work hours (i.e., when the lighting control system is not in the afterhours mode), such that the lights of the lighting control system are only turned on when the workspace areas are occupied. The occupancy sensors may be disabled in the afterhours mode, such that, for example, security guards do not inadvertently cause the lights (other than the emergency or safety lights) to be unnecessarily turned on after work hours.

Thus, there exists a need for a lighting control system having an afterhours mode in which occupancy or vacancy sensors do not need to be disabled and in which the occupant does not need to repetitively actuate a button of a keypad (e.g., once every hour) in order to keep the lights on.

SUMMARY OF THE INVENTION

A multi-modal load control system provides an improved procedure for controlling the amount of power delivered from an AC power source to an electrical load located in a space of a building in resonse to an occupancy condition or a vacancy condition in the space. The load control system comprises a sensor for detecting the occupancy condition or vacancy condition in the space, and a load control device adapted to be coupled in series electrical connection between the source and the electrical load for controlling the amount of power delivered to the electrical load. The electrical load comprises a lighting load and the load control device is responsive to the sensor to control an intensity of the lighting load. The sensor and the load control device may be implemented in separate control devices, such that the sensor operates as an occupancy sensor in a first mode of operation, defined for a first predetermined period of time, and as a vacancy sensor in a second mode of operation, defined for a second predetermined period of time. The load control system is operable to automatically change between the first and second modes of operation in response to the present time of day. For example, the sensor may be a wireless, battery-powered sensor and the load control device may be a dimmer switch. Alternatively, the load control system may include a central controller coupled to the sensor and the load control device via wired communication links.

A multi-modal load control device controls the amount of power delivered from an AC power source to a lighting load located in a space of a building in response to an occupancy condition or a vacancy condition in the space. The load control device comprises a sensor for detecting the presence and absence of an occupant in the space, and a load control circuit adapted to be coupled in series between the source and the load for controlling the amount of power delivered to the load. The sensor and the load control circuit may be implemented as part of a single load control device. The load control device may also comprise an internal controller coupled to the load control circuit and the sensor for controlling the intensity of the load in response to the sensor, such that the load control device operates as an occupancy sensor in the first mode of operation, the first mode of operation being defined for a first predetermined period of time, and as a vacancy sensor in the second mode of operation, the second mode of operation being defined for a second predetermined period of time. The internal controller is operable to automatically change between the first and second modes of operation in response to the present time of day.

Other features and advantages of the present invention will become apparent from the following description of the invention that refers to the accompanying drawings.

BRIEF DESCRIPTION OF THE DRAWINGS

The invention will now be described in greater detail in the following detailed description with reference to the drawings in which.

DETAILED DESCRIPTION OF THE INVENTION

Figure 1:
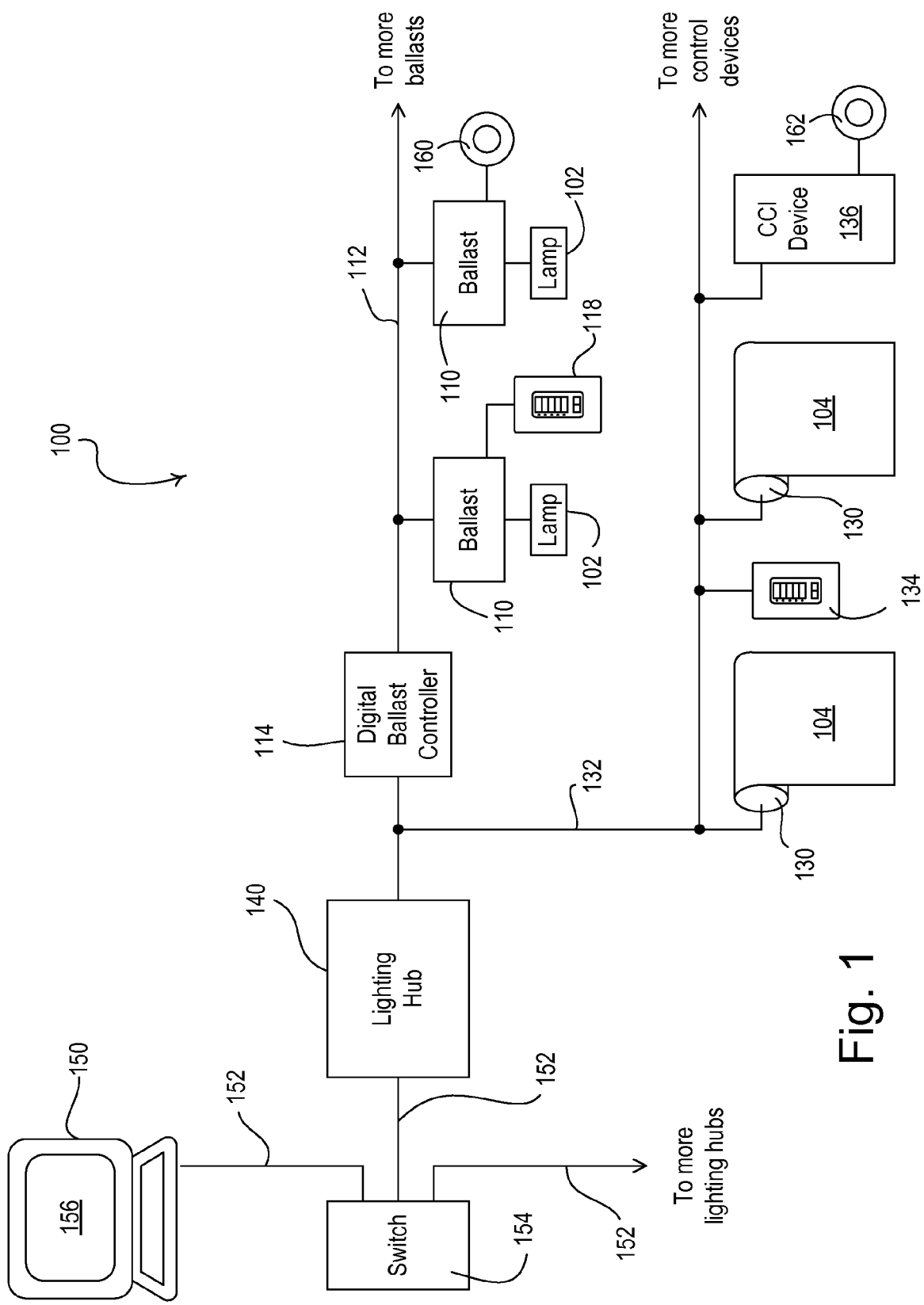
FIG. 1 is a simplified block diagram of a lighting control system comprising a lighting control device, a central controller, and multiple sensors according to a first embodiment of the present invention.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

FIG. 1 is a simplified block diagram of a load control system 100, which may be installed in, for example, a commercial building, according to a first embodiment of the present invention. The load control system 100 is operable to control the amount of power delivered from an alternating-current (AC) power source (not shown) to a plurality of electrical loads. Specifically, the load control system 100 is operable to control the level of illumination in a space of the building by controlling the intensity level of the electrical lights in the space and the daylight entering the space. As shown in FIG. 1, the load control system 100 is operable to control the amount of power delivered to (and thus the intensity of) a plurality of lighting loads, e.g., a plurality of fluorescent lamps 102. The load control system 100 is further operable to control the position of a plurality of motorized window treatments, e.g., motorized roller shades 104, to control the amount of daylight entering the space. Examples of lighting control systems are described in greater detail in commonly-assigned U.S. Pat. No. 6,803,728, issued Oct. 12, 2004, entitled SYSTEM FOR CONTROL OF DEVICES, and U.S. patent application Ser. No. 11/870,783, filed Oct. 11, 2007, entitled METHOD OF BUILDING A DATABASE OF A LIGHTING CONTROL SYSTEM, each of which is incorporated herein by reference in its entirety.

Each of the fluorescent lamps 102 is coupled to one of a plurality of lighting control devices, such as, for example, digital electronic dimming ballasts 110, for control of the intensities of the lamps. The ballasts 110 are operable to communicate with each other via a digital ballast communication link 112. For example, the digital ballast communication link 112 may comprise a digital addressable lighting interface (DALI) communication link. The digital ballast communication link 112 is also coupled to a digital ballast controller (DBC) 114, which provides the necessary direct-current (DC) voltage to power the communication link 112 and assists in the programming of the load control system 100. Each of the ballasts 110 is operable to receive inputs from a plurality of sources, for example, an occupancy or vacancy sensor 160, a daylight sensor (not shown), an infrared (IR) receiver (not shown), or a keypad device 118. The ballasts 110 are operable to transmit digital messages to the other ballasts 110 in response to the inputs received from the various sources. An example of a digital electronic dimming ballast operable to be coupled to a communication link and a plurality of other input sources is described in greater detail in co-pending commonly-assigned U.S. patent application Ser. No. 11/011,933, filed Dec. 14, 2004, entitled DISTRIBUTED INTELLIGENCE BALLAST SYSTEM AND EXTENDED LIGHTING CONTROL PROTOCOL, the entire disclosures of which is hereby incorporated by reference.

Each of the motorized roller shades 104 comprises an electronic drive unit (EDU) 130. Each electronic drive unit 130 is preferably located inside the roller tube of the associated roller shade 104. The electronic drive units 130 are responsive to digital messages received from a keypad device 134 via a control device communication link 132. A user of the load control system 100 is operable to open or close the motorized roller shades 104, adjust the position of the shade fabric of the roller shades, or set the roller shades to preset shade positions using the keypad device 134. The user is also operable to control the intensities of the lamps 102 using the keypad device 134. A contact-closure input (CCI) devices 136 may also be coupled to the control device communication link 132 for receipt of contact closure inputs from external contact-closure output devices (not shown), such as, for example, a contact-closure output of a security system or a building management system.

The load control system 100 further comprises a central controller, e.g., a lighting hub 140, which allows for communication between a personal computer (PC) 150 and the load control devices, i.e., the ballasts 110 and the electronic drive units 130. The lighting hub 140 is coupled the digital ballast controller 114, the electronic drive units 130, and the keypad device 134 via the control device communication link 132. The lighting hub 140 and the PC 150 are coupled to an Ethernet link 152, such that the PC 150 is operable to transmit digital messages to the lighting hub 140 via a standard Ethernet switch 154. Additional lighting hubs 140 may be connected to the Ethernet link 152 via the Ethernet switch 154 to allow additional ballasts 110 and electronic drive units 130 to be included in the load control system 100. As shown in FIG. 1, the communication links 112, 132, 152 of the load control system 100 comprise wired communication links. However, the load control system 100 could alternatively comprise a wireless control system comprising wireless communication links, such as, for example, radio-frequency (RF) or an infrared (IR) communication links.

The PC 150 executes a graphical user interface (GUI) software, which is displayed on a PC screen 156. The GUI allows the user to configure and monitor the operation of the load control system 100. During configuration of the load control system 100, the user is operable to determine how many ballasts 110, digital ballast controllers 114, electronic drive units 130, and lighting hubs 140 are connected and active using the GUI software. Further, the user may also assign one or more of the ballasts 110 to a zone or a group, such that the ballasts 110 in the group respond together to, for example, an actuation of the keypad device 118. The PC 150 is operable to transmit an alert to the user in response to a fault condition, such as, a fluorescent lamp is burnt out. Specifically, the PC 150 sends an email, prints an alert page on a printer, or displays an alert screen on the PC screen 156. The lighting hubs 140 and the PC 150 comprise astronomical time clocks, such that the lighting hubs and the PC are operable to control the ballasts 110 and the electronic drive units 130 in response to the present time of the day.

The load control system 100 also comprises sensors 160, 162, which may be mounted to detect an occupancy condition (i.e., the presence of an occupant) or a vacancy condition (i.e., the absence of an occupant) in one or more of the workspace areas of the building. The load control system 100 is responsive to the movements of occupants in the vicinity of the sensors 160, 162. The sensors 160, 162 may be coupled to either the ballasts 110 on the digital ballast communication link 112 or the contact-closure input (CCI) devices 136 on the control device communication link 132. The ballast 110 and the contact-closure input devices 136 are operable to transmit digital messages to the control devices of the load control system 100 (i.e., the other ballasts, the digital ballast controllers 114, the electronic drive units 130, the lighting hub 140, and the PC 150) when the connected sensor 160, 162 changes from a vacant state to an occupied state (or vice versa). The lighting hub 140 may then transmit digital messages to the ballasts 110 to control the intensities of the lamps 102. The sensors 160, 162 may provide simple control signals to the ballasts 110 and the contact-closure input devices 136, which are representative of either the occupancy condition or the vacancy condition. Alternatively, the sensors 160, 162 may be operable to transmit more complex digital messages to the ballasts 110 and the contact-closure input devices 136. In addition, the sensors 160, 162 may be coupled directly to the digital ballast communication link 112, such that the sensors may directly transmit digital message to the digital ballast controllers 114 and the lighting hubs 140.

Figure 2:
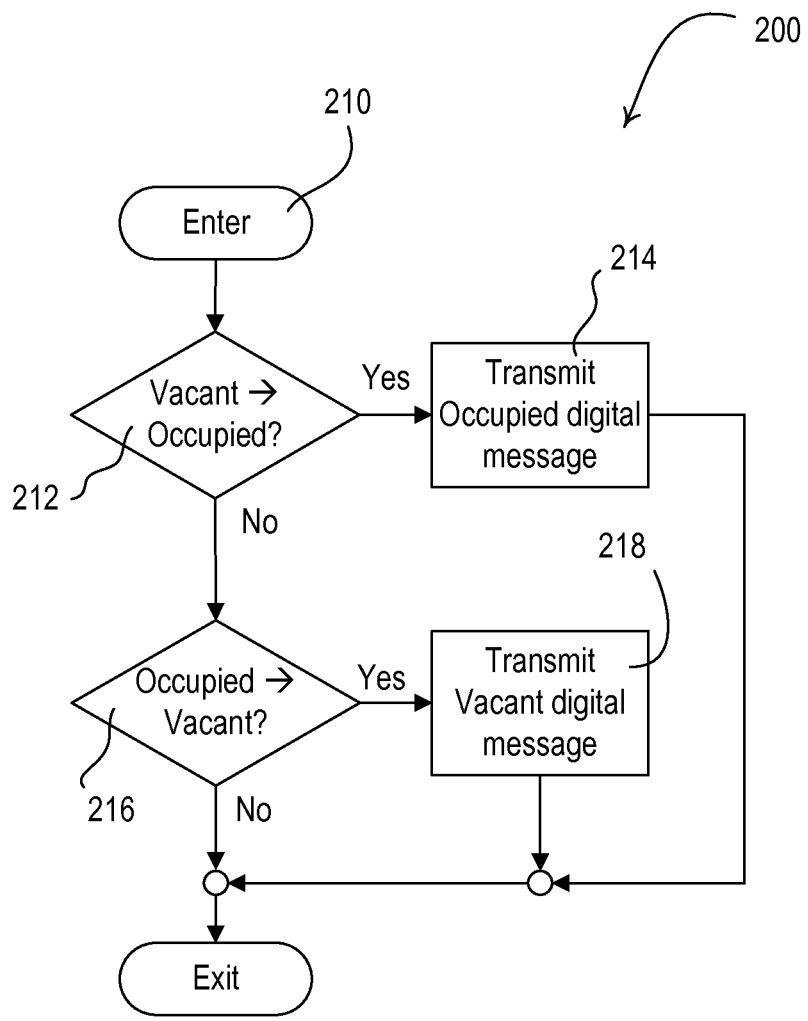
FIG. 2 is a simplified flowchart of a sensor state monitor procedure executed by each of the sensors of the lighting control system of FIG. 1.

FIG. 2 is a simplified flowchart of a sensor state monitor procedure 200 executed by the ballasts 110 or the contact-closure input devices 136 of the load control system 100. The sensor state monitor procedure 200 is executed whenever the state of the connected sensor 160, 162 changes at step 210. If the connected sensor 160, 162 has changed from the vacant state to the occupied state at step 212, the ballast 110 or the contact-closure input device 136 transmits an occupied message to the lighting hub 140 at step 214. If the connected sensor 160, 162 has changed from the occupied state to the vacant state at step 216, a vacant message is transmitted to the lighting hub 140 at step 218. The lighting hub 140 controls the lamps 102 in response to receiving occupied or vacant messages. For example, the lighting hub 140 may turn on the lamps 102 in a space of the building in response to receiving occupied messages from the sensors 160, 162 located in that space. Similarly, the lighting hub 140 may turn off the lamps 102 in the space in response to receiving vacant messages from the sensors 160, 162 located in that space.

The load control system 100 operates in a first mode of operation (e.g., a normal mode) during times of the day when the building is typically occupied and in a second mode of operation (e.g., an afterhours mode) when the building is typically not occupied. The load control system 100 is operable to automatically change between the first and second modes of operation in response to the present time of day. For example, the load control system 100 may operate in the normal mode during normal work hours, such as, between a first time (e.g., 7 A.M.) and a second time (e.g., 6 P.M.) each work day (e.g., Monday through Friday). Further, the load control system 100 may operate in the afterhours mode, for example, after the second time and before the first time each work day and during the entire days on the weekends. For example, the lighting hub 140 and the PC 150 may change between the normal mode and the afterhours mode in response to the internal astronomical time clocks.

According to the first embodiment of the present invention, the lighting hub 140 and the PC 150 are operable to automatically choose which of the received occupied and vacant message to which to respond. The lighting hub 140 may control the intensities of the lamps 102 in response to one or both of the received occupied or vacant messages. Specifically, during normal work hours (i.e., in the normal mode), the lighting hub 140 turns the lamps 102 on and off in response to changes in the states of the sensors 160, 162. For example, the lighting hub 140 may transmit digital message to the ballasts to turn the lamps 102 on when one of the sensors 160, 162 has detected an occupancy condition and turn the lamps off when one of the sensors has detected a vacancy condition. In the afterhours mode, the lighting hub 140 only controls the lamps 102 (i.e., turns off the lamps) in response to one of the sensors 160, 162 detecting a vacancy condition. The lighting hub 140 does not turn on the lamps 102 when one of the sensors 160, 162 detects an occupancy condition in one of the workspace areas during the afterhours mode. In this way, the lamps 102 are not inadvertently turned on in response to, for example, a security guard walking through the area after normal work hours. However, the lamps 102 may be turned on in response to an actuation of a button of one of the keypad devices 118, 134 during the afterhours mode. If the lamps 102 are turned on by an actuation of a button of the keypad device 118 after normal work hours, the lighting hub 140 will turn the lamps 102 off until the space becomes vacant or when the lamps are turned off manually by a subsequent actuation of a button of the keypad device. The occupant of the space is not required to actuate a button of the keypad device 118 to keep the lamps 102 illuminated while the space is occupied. Accordingly, the sensors 160, 162 operate as occupancy sensors during the normal mode of operation and as vacancy sensors during the afterhours mode.

Alternatively, the lighting hub 140 and the PC 150 may be operable to change between the normal mode and the afterhours mode in response to an actuation of one of a button of one of the keypad devices 118, 134, or in response to the contact-closure input devices 136 receiving a contact-closure input from an external contact-closure output device. For example, the ballasts 110 may be operable to transmit an operation-mode digital message to the lighting hub 140 or the PC 150 via the digital ballast communication link 112 in response to an actuation of a button of a connected keypad device 118. Similarly, the keypad devices 134 and the contact-closure input devices 136 may also transmit operation-mode digital messages to the lighting hub 140 or the PC 150 in response to receiving inputs. Accordingly, the lighting hub 140 and the PC 150 may be operable to change from the normal mode of the afterhours mode (and vice versa) in response to receiving an operation-mode digital message.

Figure 3:
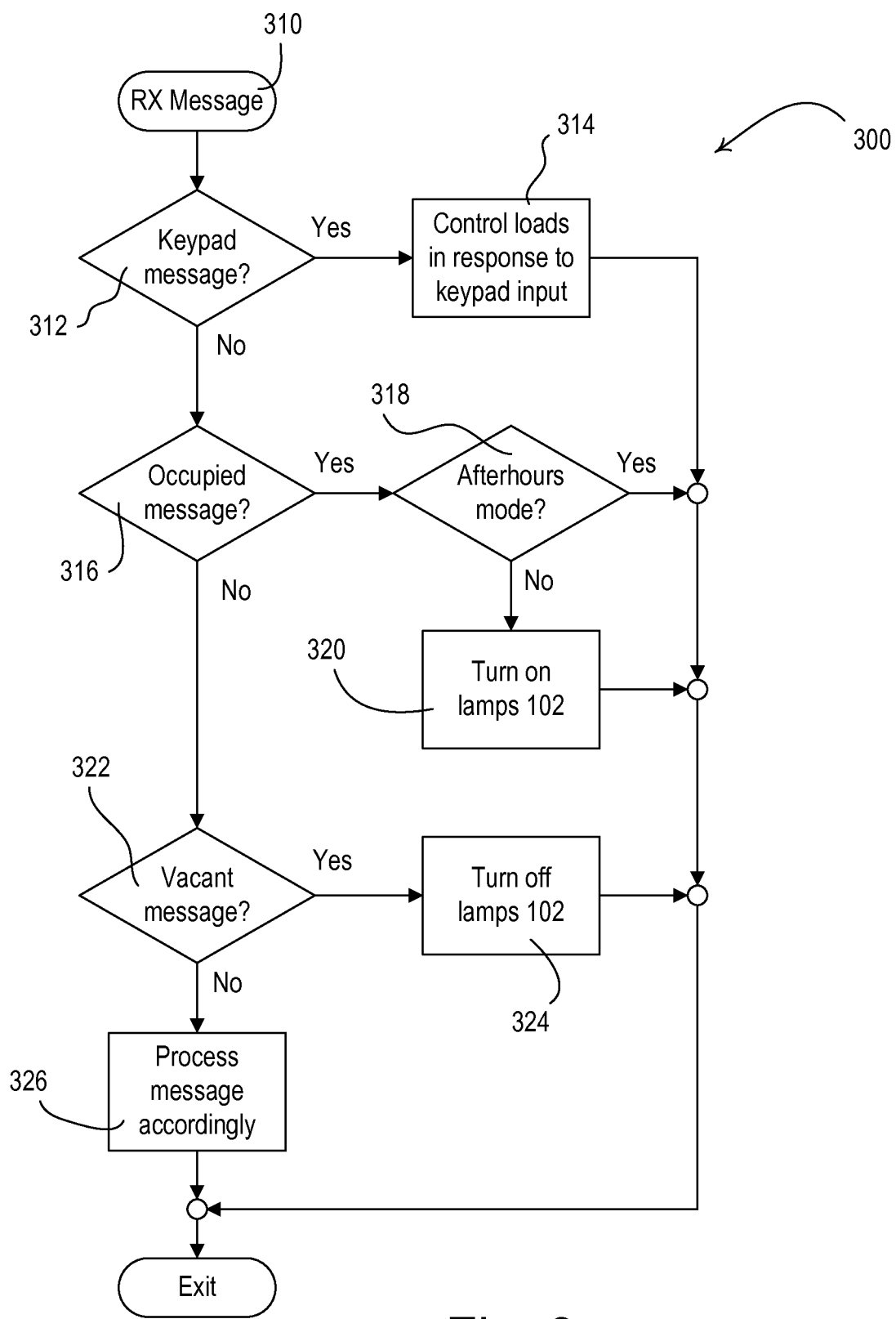
FIG. 3 is a simplified flowchart of a control procedure executed by the central controller of the lighting control system of FIG. 1.

FIG. 3 is a simplified flowchart of a control procedure 300 executed by the lighting hub 140 of the load control system 100 when a digital message is received from the control devices coupled to the digital ballast communication link 112 and the control device communication link 132 at step 310. If a digital message is received from one of the keypad devices 118, 134 at step 312, the lighting hub 140 controls the loads (i.e., the lamps 102 and the motorized roller shades 104) in response to the message at step 314 by transmitting digital messages to the ballasts 110 or the electronic drive units 130. For example, if a user actuates a button of one of the keypad devices 118, 134 to turn on the lamps 102, the lighting hub 140 transmits digital messages to the appropriate ballasts 110 at step 314 to cause the ballasts to turn on the lamps that correspond to the actuated button of the keypad device, for example, the lamps in the area that the user is occupying.

The lighting hub 140 only turns on the lamps 102 in response to one of the sensors 160, 162 changing from the vacant state to the occupied state when the lighting hub 140 is operating in the normal mode. Specifically, if the received digital message is an occupied message at step 316 and the lighting hub 140 is not in the afterhours mode at step 318, the lighting hub transmits digital messages to the ballast 110 to turn the lamps 102 on at step 320. However, if the lighting hub 140 is in the afterhours mode at step 318, the lighting hub does not control the lamps 102 and the control procedure 300 simply exits.

When the lighting hub 140 is operating in either the normal mode or the afterhours mode, the lighting hub turns off the lamps 102 in response to one of the sensors 160, 162 changing from the occupied state to the vacant state. Specifically, if the lighting hub 140 receives a vacant message at step 322, the lighting hub transmits digital messages to the ballasts 110 to turn off the appropriate lamps 102 at step 324, before the control procedure 300 exits. If the received digital message is not a vacant message at step 322, the lighting hub 140 processes the received message accordingly at step 326, and the control procedure 300 exits. While the control procedure 300 is shown and described herein as executed by the lighting hub 140, the control procedure could alternatively be executed by the PC 150.

Figure 4:
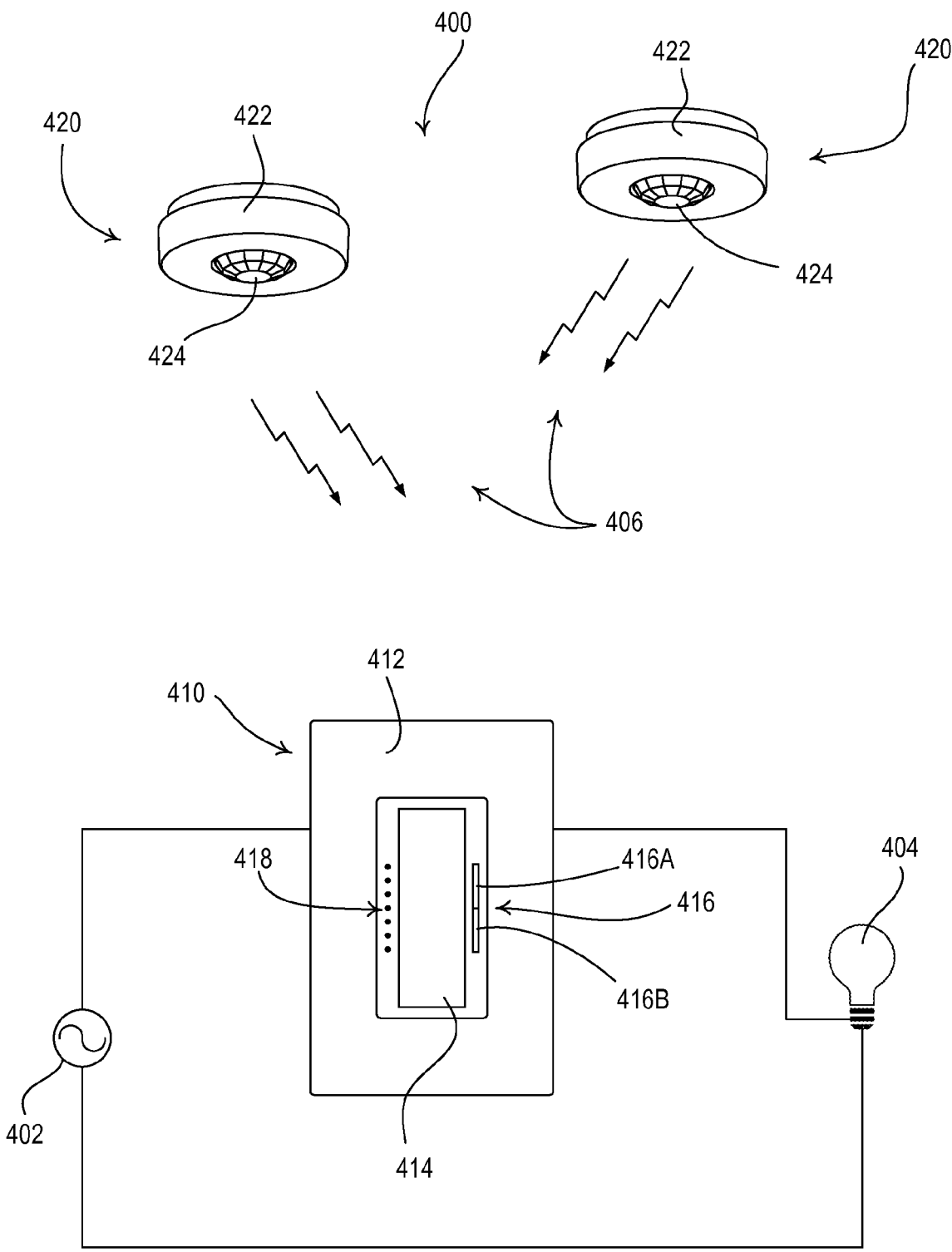
FIG. 4 is a simple diagram of a radio-frequency (RF) lighting control system comprising a dimmer switch and remote wireless, battery-powered sensors according to a second embodiment of the present invention.

FIG. 4 is a simple diagram of a radio-frequency (RF) lighting control system 400 comprising a dimmer switch 410 and two remote wireless, battery-powered sensors 420 according to a second embodiment of the present invention. The dimmer switch 410 is adapted to be coupled in series electrical connection between an AC power source 402 and a lighting load 404 for controlling the amount of power delivered to the lighting load. The dimmer switch 410 may be adapted to be wall-mounted in a standard electrical wallbox. Alternatively, the dimmer switch 410 could be implemented as a table-top load control device. The dimmer switch 410 comprises a faceplate 412, a toggle actuator 414 (i.e., a button), and an intensity adjustment actuator 416. Actuations of the toggle actuator 414 toggle, i.e., turn off and on, the lighting load 404. Actuations of an upper portion 416A or a lower portion 416B of the intensity adjustment actuator 416 respectively increase or decrease the amount of power delivered to the lighting load 404 and thus increase or decrease the intensity of the lighting load 404 from a minimum intensity (e.g., approximately 1%) to a maximum intensity (e.g., approximately 100%). A plurality of visual indicators 418, e.g., light-emitting diodes (LEDs), are arranged in a linear array on the dimmer switch 410 and are illuminated to provide feedback of the intensity of the lighting load 404.

The remote sensors 420 are removably mountable to a ceiling or a wall, for example, in the vicinity of (i.e., a space around) the lighting load 404 controlled by the dimmer switch 410, and are operable to detect an occupancy condition (i.e., the presence of an occupant) or a vacancy condition (i.e., the absence of an occupant) in the vicinity of the lighting load. The remote sensors 420 may be spaced apart to detect occupancy conditions in different areas of the vicinity of the lighting load 404. The remote occupancy sensors 420 each comprise an enclosure 422 and a lens 424 for conducting infrared energy from an occupant in the space towards an internal detector, e.g., a pyroelectric infrared (PIR) detector (not shown), which is housed in an enclosure. The remote sensors 420 are operable to process the output of the internal detector to determine whether an occupancy condition or a vacancy condition is presently occurring in the space, for example, by comparing the output of the internal detector to a predetermined occupancy voltage threshold. Alternatively, the internal detector could comprise an ultrasonic detector, a microwave detector, or any combination of PIR detectors, ultrasonic detectors, and microwave detectors. An example of a wireless, battery-powered sensor is described in greater detail in commonly-assigned, co-pending U.S. patent application Ser. No. 12/371,183, filed Feb. 13, 2009, entitled BATTERY-POWERED OCCUPANCY SENSOR, the entire disclosure of which is hereby incorporated by reference.

During a setup procedure of the RF lighting control system 400, the dimmer switch 410 may be assigned to (i.e., associated with) one or more of the remote sensors 420. The remote sensors 420 transmit digital messages wirelessly via RF signals 406 to the dimmer switch 410 in response to detecting an occupancy or vacancy condition in the space. A digital message transmitted by the remote sensors 420 may include a command and identifying information, for example, a serial number (i.e., a unique identifier) associated with the transmitting remote sensor. The dimmer switch 410 is responsive to messages containing the serial numbers of the remote sensors 420 to which the dimmer switch is assigned.

According to the second embodiment, the commands included in the digital messages transmitted by the remote sensors 420 may comprise one of an occupied command or a vacant command. The remote sensors 420 are each operable to transmit a digital message including an occupied command to the dimmer switch 410 when the remote sensor has detected an occupancy condition (i.e., the presence of an occupant). The remote sensors 420 are each further operable to transmit a digital message including a vacant command to the dimmer switch 410 when the remote sensor has detected a vacancy condition (i.e., the absence of an occupant). For example, the remote sensors 420 may execute a sensor state monitor procedure (similar to the sensor state monitor procedure 200 of the sensors 460 of the first embodiment as shown in FIG. 2) in order to transmit the appropriate digital messages to the dimmer switch 410.

When the lighting load 404 is off, the dimmer switch 410 is operable to turn on the lighting load in response to receiving a first occupied command from any one of the remote sensors 420. The dimmer switch 410 keeps track of the remote sensors 420 from which the dimmer switch has received occupied commands by storing the serial numbers of those remote sensors in memory. The dimmer switch 410 is operable to turn off the lighting load 404 in response to the last vacant command received from those remote sensors 420 from which the occupancy sensor received occupied commands. For example, if the remote sensors 420 both transmit occupied commands to the dimmer switch 410, the dimmer switch will not turn off the lighting load 404 until subsequent vacant commands are received from both of the occupancy sensors. An example of an RF lighting control system having wireless sensors is described in greater detail in U.S. patent application Ser. No. 12/203,518, filed Sep. 3, 2008, entitled RADIO-FREQUENCY LIGHTING CONTROL SYSTEM WITH OCCUPANCY SENSING, the entire disclosure of which is hereby incorporated by reference.

According to the second embodiment of the present invention, the dimmer switch 410 determines whether to respond to the received digital messages depending upon the present time of the day. For example, after sunrise and before sunset (i.e., in a first mode of operation during daylight hours), the dimmer switch 410 may turn on and turn off the lighting load 404 in response to the digital messages received from the remote sensors 420 (i.e., the remote sensors operate as occupancy sensors). Before sunrise and after sunset (i.e., in a second mode of operation during nighttime hours), the dimmer switch 410 only turns off (and does not turn on) the lighting load in response to the digital messages received from the remote sensors 420 (i.e., the remote sensors operate as vacancy sensors). If the dimmer switch 410 turns on the lighting load 404 in response to an actuation of the toggle actuator 414 during the nighttime hours, the dimmer switch will turn off the lighting load when the space becomes vacant or when the toggle actuator is next pressed. In other words, the dimmer switch 410 turns off the lighting load 404 in response to vacant messages received from the remote sensors 420 at all times during the twenty-four hours of a day, but only turns on the lighting load in response to occupancy message received during a portion of the day (i.e., during the daylight hours).

The dimmer switch 410 may comprise an astronomical time clock for determining the present time of the day. The dimmer switch 410 is operable to determine the times for sunrise and sunset for a specific day from the astronomical time clock. The dimmer switch 410 is then operable to change between the first and second modes of operation in response to the sunrise and sunset times. The dimmer switch 410 could additionally add or subtract an offset time from the sunrise and sunset times for determining the beginning and ending times of the first and second modes of operation. The astronomical time clock may be programmed (i.e., the present time and date could be set) using a wireless controller, such as, for example, a personal digital assistant (PDA) or a personal computer (PC). Alternatively, the astronomical time clock could be programmed using an advanced programming mode of the dimmer switch 410. An example of an advanced programming mode for a dimmer switch is described in greater detail in U.S. Pat. No. 7,190,125, issued Mar. 13, 2007, entitled PROGRAMMABLE WALLBOX DIMMER, the entire disclosure of which is hereby incorporated by reference. The dimmer switch 410 could alternatively change between the first and second modes of operation at predetermined times each day, for example, at 7 A.M. and 5 P.M.

Figure 5:
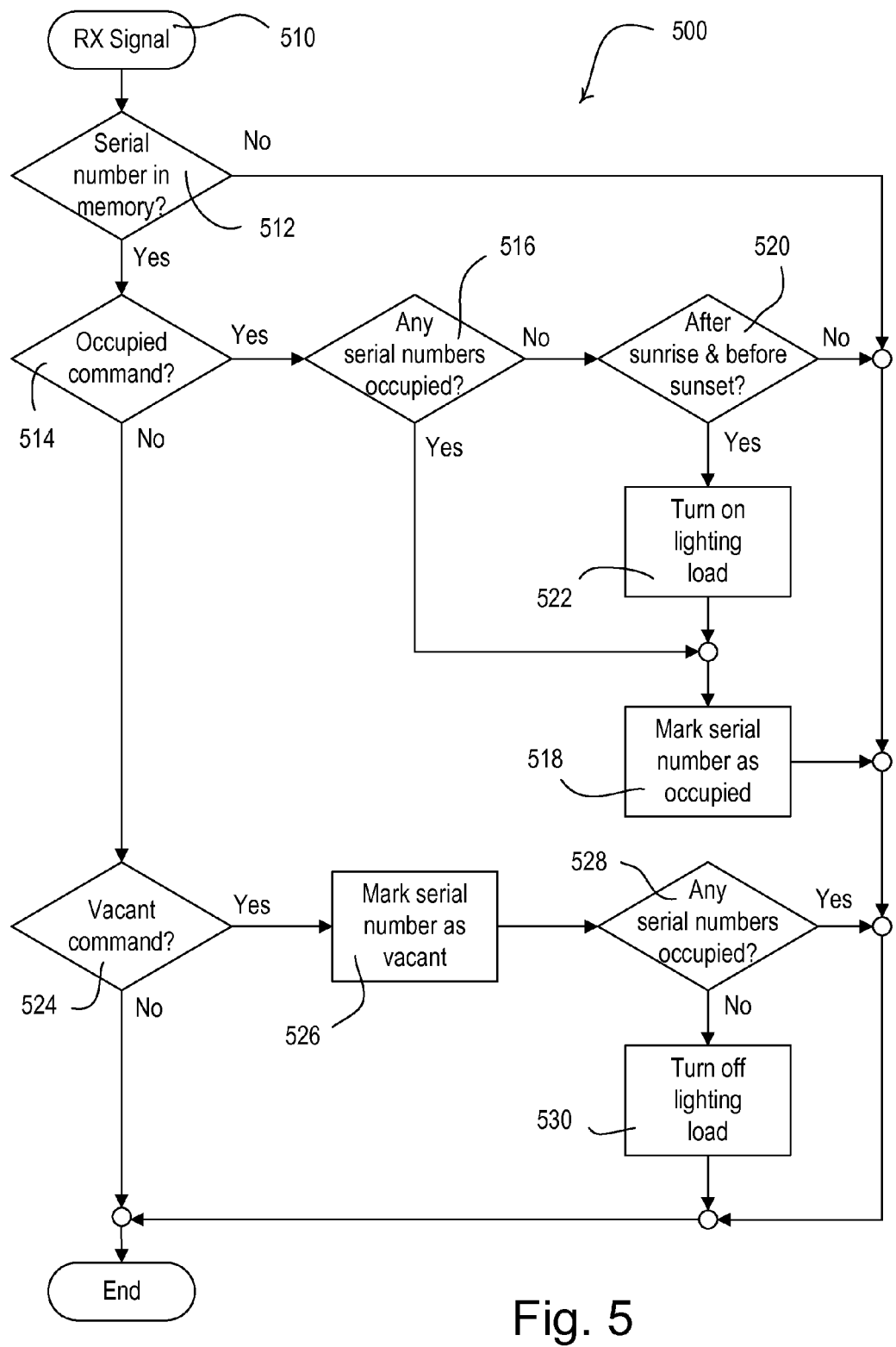
FIG. 5 is a simplified flowchart of a control procedure executed by the dimmer switch of the lighting control system of FIG. 4 according to the second embodiment.

FIG. 5 is a simplified flowchart of a control procedure 500 executed by the dimmer switch 410 of the lighting control system 400 when a digital message is received from the one of the remote sensors 420 at step 510. If the serial number provided in the received digital message is not stored in memory in the dimmer switch 410 at step 512 (i.e., the remote sensor 420 from which the dimmer switch received the digital message is not assigned to the dimmer switch), the dimmer switch does not process the received digital message and the control procedure 500 simply exits.

If the serial number is stored in memory of the dimmer switch 410 (i.e., the remote sensor 420 from which the dimmer switch received the digital message is assigned to the dimmer switch) at step 512, and the received message includes an occupied command at step 514, the dimmer switch determines if any of the serial numbers stored in memory are already marked as occupied at step 516. If so, the dimmer switch 410 simply marks the serial number from the received digital message as occupied at step 518, and the control procedure 500 exits. If there are not any serial numbers already marked as occupied at step 516, and the present time of the day (as determined from the astronomical time clock) is after sunrise and before sunset at step 520, the dimmer switch 410 turns on the lighting load 404 at step 522 and marks the serial number as occupied at step 518, before the control procedure 500 exits. If the present time of the day is not after sunrise and before sunset at step 520, the control procedure 500 simply exits.

If the received message does not include an occupied command at step 514, but includes a vacant command at step 524, the dimmer switch 410 marks the serial number from the digital message as vacant at step 526. If any of the serial numbers stored in memory are still marked as occupied at step 528, the control procedure 500 simply exits. If there are not any serial numbers still marked as occupied at step 528, the dimmer switch 410 turns off the lighting load 404 at step 530 and the control procedure 500 exits.

According to a third embodiment of the present invention, the remote sensor 420 may comprise an astronomical time clock and may transmit different digital messages to the dimmer switch 410 depending upon the present time of the day. Specifically, after sunrise and before sunset (i.e., during the daylight hours), each of the remote sensors 420 transmits a digital message having an "occupied-take-action" command to the dimmer switch 410 in response to detecting an occupancy condition (i.e., the presence of an occupant) in the space. Before sunrise and after sunset (i.e., during the nighttime hours), each of the remote sensors 420 transmits a digital message having an "occupied-no-action" command to the dimmer switch 410 in response to detecting an occupancy condition in the space. During both the daylight hours and the nighttime hours, each of the remote sensors 420 transmits a digital message having a vacant command to the dimmer switch 410 in response to detecting a vacancy condition in the space.

When the lighting load 404 is off, the dimmer switch 410 turns on the lighting load in response to receiving a first occupied-take-action command from any one of the remote sensors 420. The dimmer switch 410 does not turn on the lighting load 404 in response to receiving an occupied-no-action command from any one of the remote sensors 420. The dimmer switch 410 keeps track of the remote sensors 420 from which the dimmer switch has received either occupied-take-action or occupied-no-action commands. The dimmer switch 410 turns off the lighting load 404 in response to the last vacant command received from those remote sensors 420 from which the occupancy sensor received either occupied-take-action or occupied-no-action commands. For example, if both remote sensors 420 have transmitted either occupied-take-action commands or occupied-no-action commands to the dimmer switch 110, the dimmer switch will not turn off the lighting load 104 until subsequent vacant commands are received from each of the remote sensors.

Figure 6:
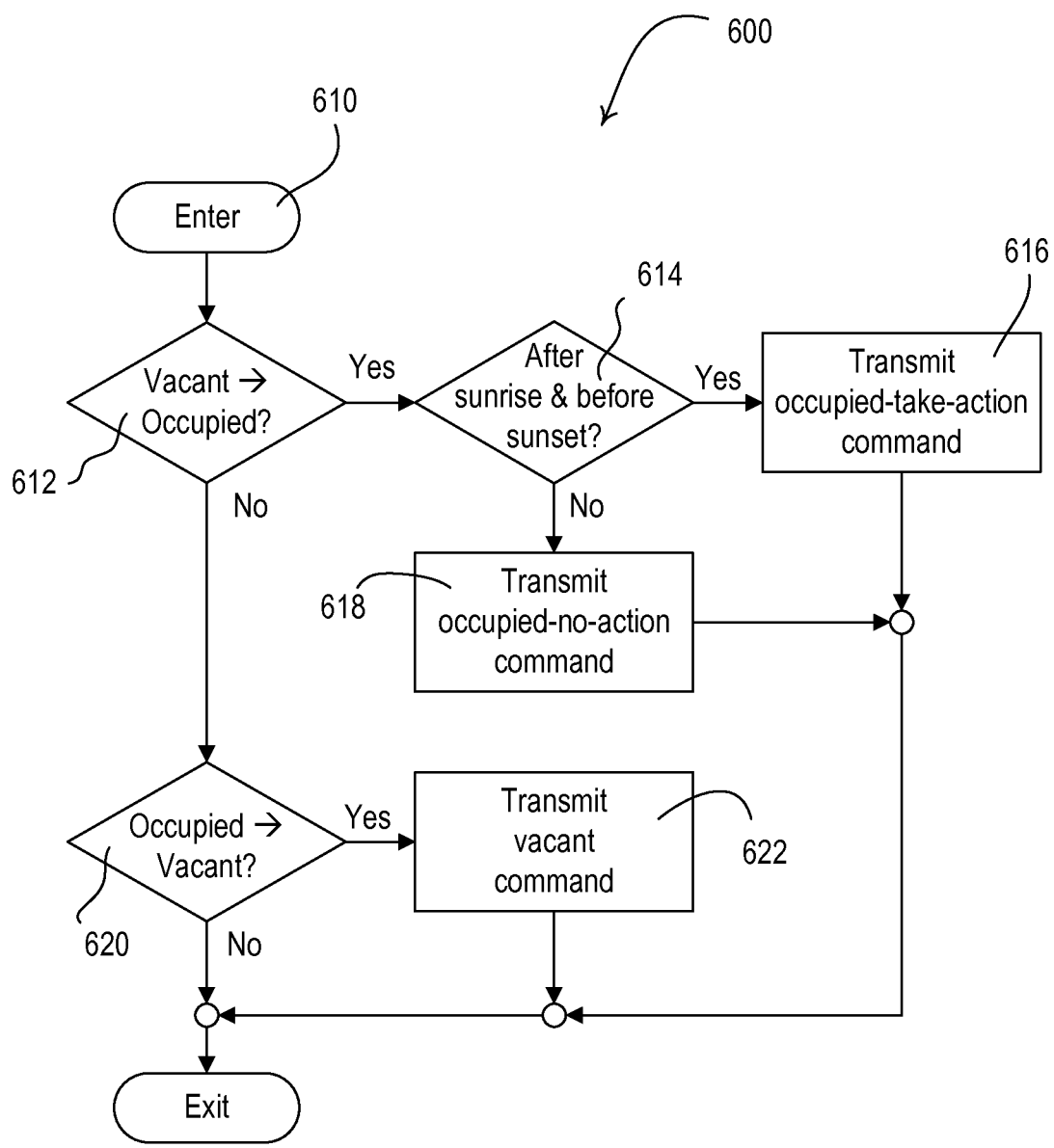
FIG. 6 is a simplified flowchart of a transmission procedure executed by each of the remote sensors of the lighting control system of FIG. 4 according to a third embodiment.

FIG. 6 is a simplified flowchart of a transmission procedure 600 executed by each of the remote sensors 420 according to the third embodiment. The transmission procedure 600 is executed by each of the remote sensors 420 whenever the state of the sensor changes at step 610 (i.e., from a vacant state to an occupied state, or vice versa). If the remote sensor 420 has changed from the vacant state to the occupied state at step 612, the remote sensor 420 determines the present time of the day at step 614 using, for example, the astronomical time clock. If the present time of the day is after sunrise and before sunset (i.e., during the daylight hours) at step 614, the remote sensor 420 transmits a digital message including an occupied-take-action command to the dimmer switch 410 at step 616, and the transmission procedure 600 exits. If the present time is before sunrise and after sunset (i.e., during the nighttime hours) at step 614, the remote sensor 420 transmits a digital message including an occupied-no-action command to the dimmer switch 410 at step 618, before the transmission procedure 600 exits. If the remote sensor 420 has changed from the occupied state to the vacant state at step 620, the remote sensor 420 transmits a digital message including a vacant command to the dimmer switch 410 at step 622, and the transmission procedure 600 exits.

Figure 7:
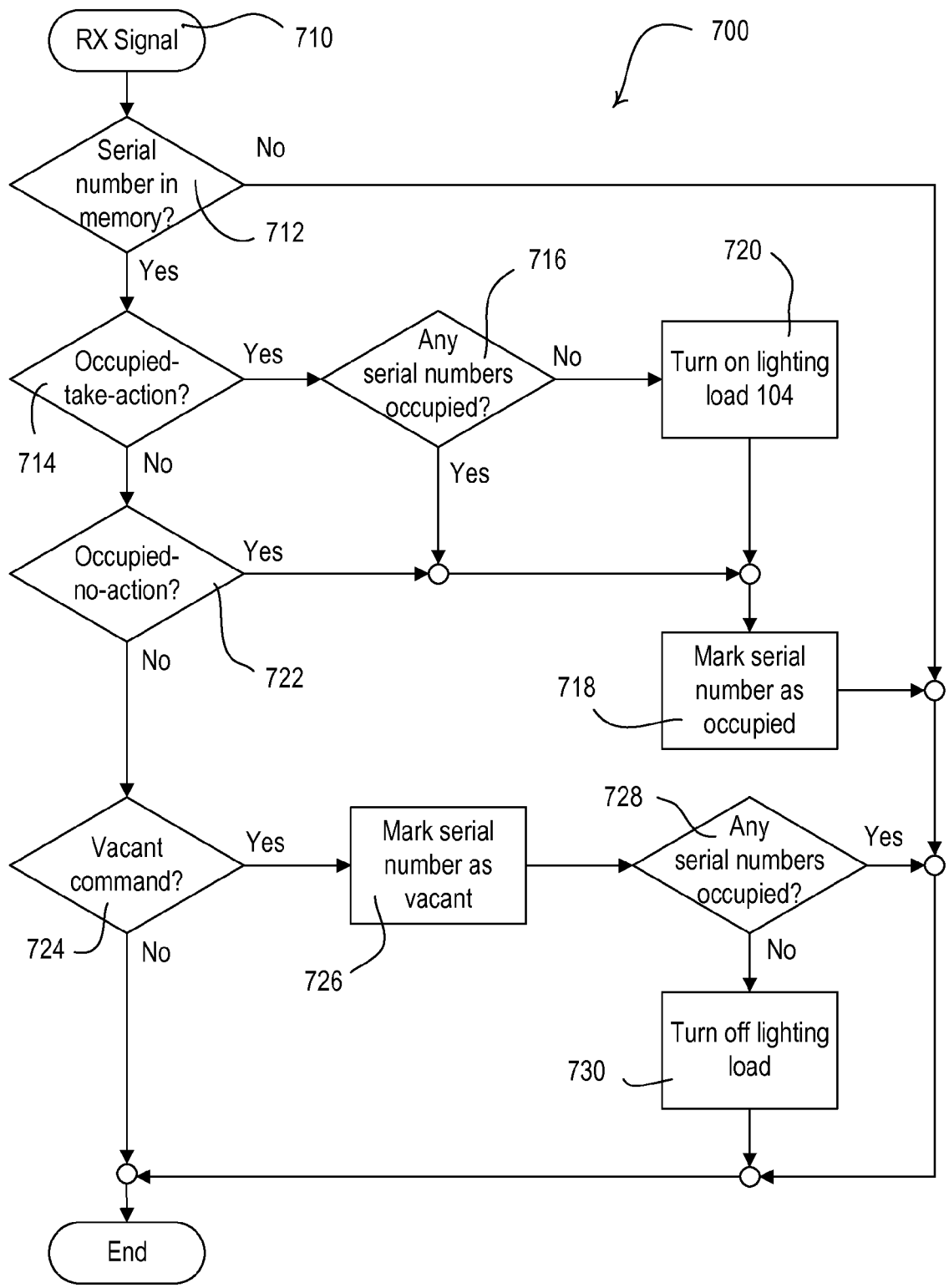
FIG. 7 is a simplified flowchart of a control procedure executed by the dimmer switch of the lighting control system of FIG. 4 according to the third embodiment.

FIG. 7 is a simplified flowchart of a control procedure 700 executed by the dimmer switch 410 of the third embodiment when a digital message is received from the one of the remote sensors 420 at step 710. If the serial number provided in the received digital message is stored in memory in the dimmer switch 410 (i.e., the remote sensor 420 from which the dimmer switch received the digital message is assigned to the dimmer switch) at step 712, the dimmer switch determines if the received message includes an occupied-take-action command at step 714 (i.e., the present time of the day is during the daylight hours). If the received message includes an occupied-take-action command at step 714 and there are serial numbers already marked as occupied at step 716, the dimmer switch 410 marks the serial number from the received digital message as occupied at step 718, and the control procedure 700 exits. If there are not any serial numbers are already marked as occupied at step 716 (i.e., the space is vacant and the received message includes the first occupied-take-action command received by the dimmer switch 410), the dimmer switch turns on the lighting load 404 at step 720 and marks the serial number as occupied at step 718 before the control procedure 700 exits.

If the received message does not include an occupied-take-action command at step 714, but includes an occupied-no-action command at step 722 (i.e., during the nighttime hours), the dimmer switch 410 marks the serial number of the received digital message as occupied in memory at step 718, before the control procedure 700 exits. If the received message does not include an occupied-no-action command at step 722, but includes a vacant command at step 724, the dimmer switch 410 marks the serial number from the digital message as vacant at step 726. If any of the serial numbers stored in memory are still marked as occupied at step 728, the control procedure 700 simply exits. If there are not any serial numbers still marked as occupied at step 728, the dimmer switch 410 turns off the lighting load 404 at step 730 and the control procedure 700 exits.

Figure 8:
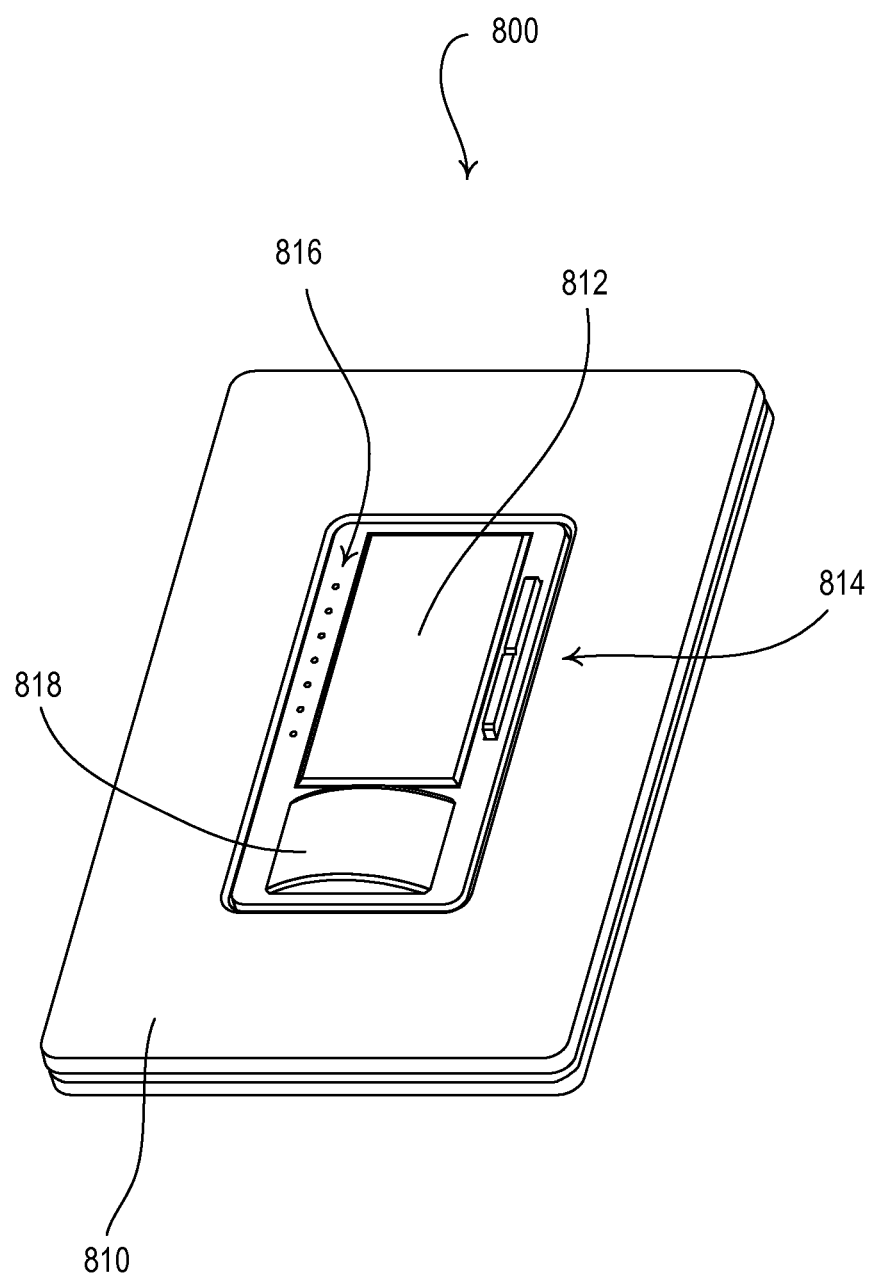
FIG. 8 is a simplified perspective view of a wall-mounted load control device having an integral sensor according to a fourth embodiment of the present invention.

FIG. 8 is a simplified perspective view of a wall-mounted load control device 800 according to a fourth embodiment of the present invention. The load control device 800 is adapted to be coupled in series electrical connection between an AC power source 802 (FIG. 9) and an electrical load, e.g., a lighting load 804 (FIG. 9), for controlling the amount of power delivered to the load. The load control device 800 comprises a faceplate 810, a toggle actuator 812 for allowing a user to toggle the connected lighting load on and off, an intensity adjustment actuator 814 for adjusting the amount of power being delivered to the lighting load, and a linear array of visual indicators 816 for providing feedback to the user. The load control device 800 further comprises a lens 818 positioned adjacent the toggle actuator 812 for directing the infrared energy from the user in the space to an internal detector, e.g., a PIR detector 830 (FIG. 9).

Figure 9:
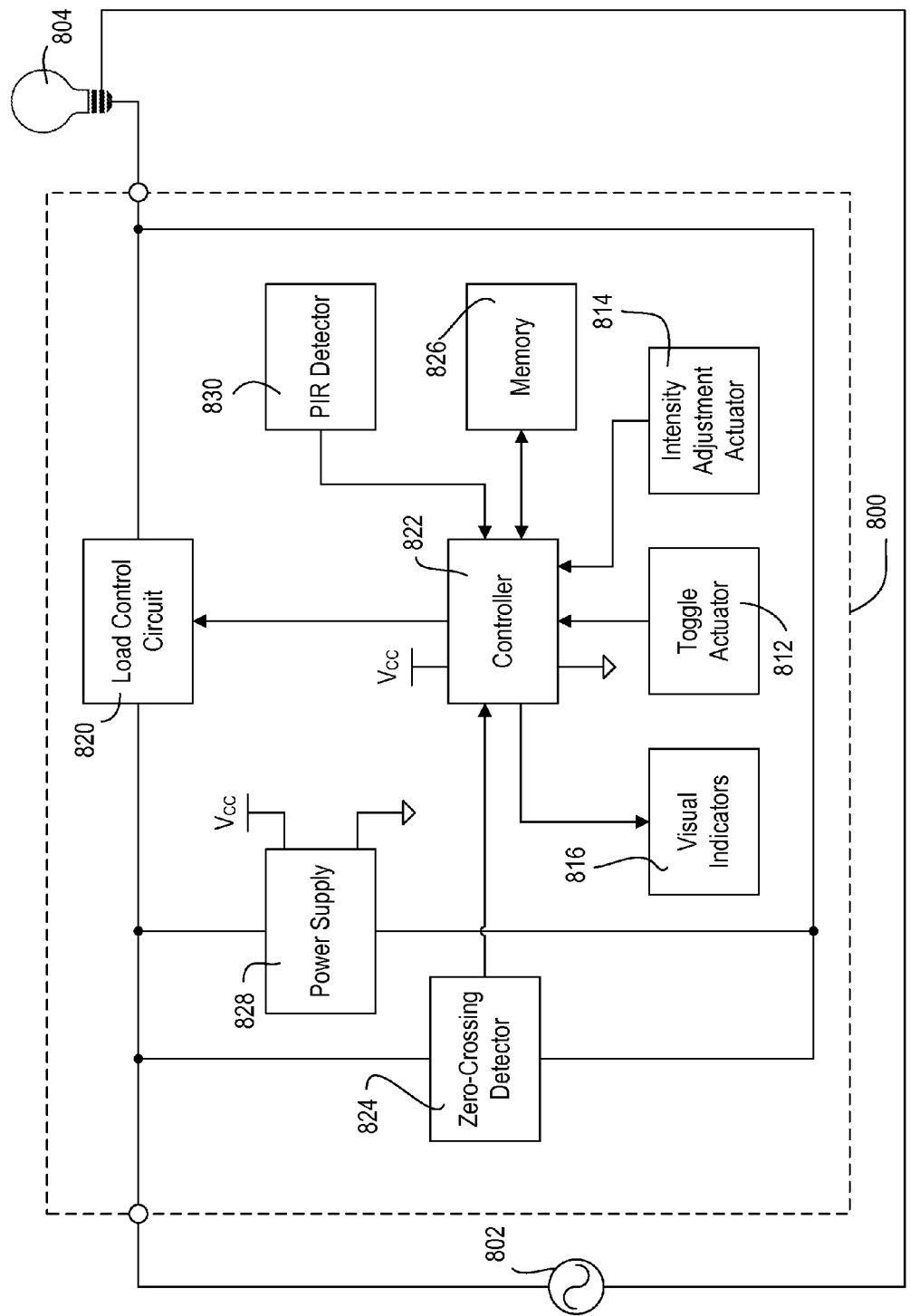
FIG. 9 is a simplified block diagram of the load control device of FIG. 8.

FIG. 9 is a simplified block diagram of the load control device 800 of the fourth embodiment. The load control device 800 comprises a load control circuit 820 coupled in series electrical connection between the AC power source 802 and the lighting load 804 for control of the power delivered to the lighting load. The load control circuit 820 may comprise any suitable controllable switching device, for example, a relay or a bidirectional semiconductor switch, such as, a triac, a field-effect transistor (FET) in a rectifier bridge, or two FETs in anti-series connection. The load control device 800 further comprises an internal controller 822 coupled to the load control circuit 820 for control of the power delivered to the load, for example, to adjust the intensity of the lighting load 804 using a phase-control technique as is well known in the art. The controller 822 may be implemented as a microcontroller, a microprocessor, a programmable logic device (PLD), an application specific integrated circuit (ASIC), a field-programmable gate array (FPGA), or any suitable processing device. The controller 822 is operatively coupled to the control actuator 812 and the intensity adjustment actuator 814 for receiving inputs from the toggle actuator 812 and the intensity adjustment actuator 814. The controller 822 also operates to illuminate the visual indicators 816 for providing feedback to the user of the load control device 800.

A zero-crossing detector 824 determines the zero-crossings of the input AC waveform from the AC power supply 802. A zero-crossing is defined as the time at which the AC supply voltage transitions from positive to negative polarity, or from negative to positive polarity, at the beginning of each half-cycle. The controller 822 controls the load control circuit 820 at predetermined times relative to the zero-crossing points of the AC waveform using the phase-control technique. The controller 822 is also coupled to a memory 826 for storage of operating characteristics of the load control device 800. A power supply 828 generates a direct-current (DC) voltage $V_{CC}$ for powering the controller 822, the memory 826, and other low-voltage circuitry of the load control device 800.

The controller 822 is operatively coupled to the PIR detector 830 for detecting occupancy or vacancy conditions in the space around the load control device 800. The controller 822 changes from a vacant state to an occupied state (and vice versa) in response to a control signal provided by the PIR detector 830. The controller 822 comprises an astronomical time clock for determining the present time of the day, and controls the load control circuit 820 to control the lighting load 804 in response to the present time of the day. For example, after sunrise and before sunset (i.e., during daylight hours), the controller 822 turns on the lighting load 804 in response to the PIR detector 830 detecting an occupancy condition in the space, and turns off the lighting load in response to the PIR detector detecting a vacancy condition in the space. Before sunrise and after sunset (i.e., during nighttime hours), the controller 822 only turns off the lighting load 804 in response to the PIR detector detecting a vacancy condition in the space. The controller 822 does not turn on the lighting load 804 in response to the PIR detector detecting an occupancy condition during the nighttime hours. If the controller 822 turns on the lighting load 804 in response to an actuation of the toggle actuator 812 during the nighttime hours, the controller will turn off the lighting load when the space becomes vacant or when the toggle actuator is actuated once again. In other words, the load control device 800 operates as an occupancy sensor during the daylight hours and operates as a vacancy sensor during the nighttime hours.

Figure 10:
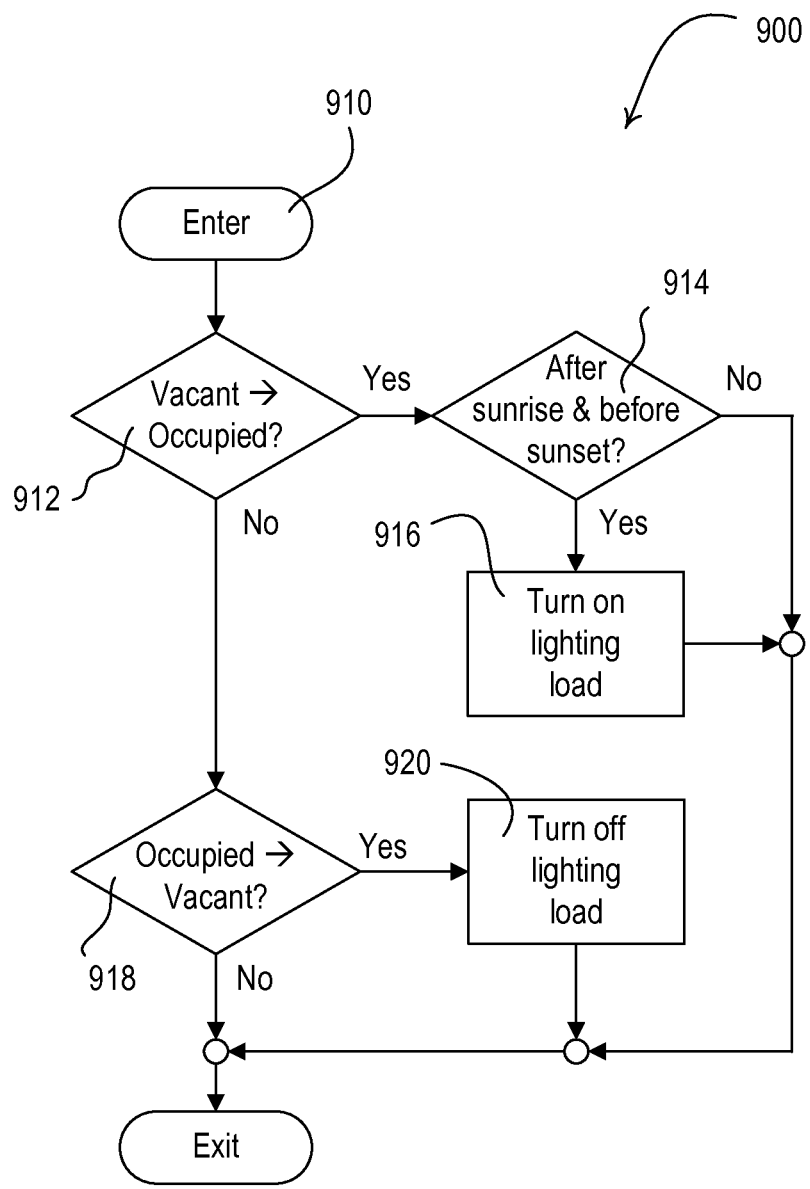
FIG. 10 is a simplified flowchart of a control procedure executed by an internal controller of the load control device of FIG. 8 according to the fourth embodiment.

FIG. 10 is a simplified flowchart of a control procedure 900 executed by the controller 822 of the load control device 800 according to the fourth embodiment. The control procedure 900 is executed by the load control device 800 whenever the state of the controller 822 changes at step 910 (i.e., from a vacant state to an occupied state, or vice versa). If the controller 822 has changed from the vacant state to the occupied state at step 912, and the present time of the day is after sunrise and before sunset (i.e., during the daylight hours) at step 914, the controller turns on the lighting load 804 at step 916, before the control procedure 900 exits. If the present time is before sunrise and after sunset (i.e., during the nighttime hours) at step 914, the control procedure 900 simply exits. If the controller 822 has changed from the occupied state to the vacant state at step 918, the controller turns off the lighting load 804 at step 920, and the control procedure 900 exits.

While the present invention has been described with reference to the ballasts 110, the dimmer switch 410, and the load control device 800 that are able to adjust the amount of power being delivered to a connected lighting load, and thus the intensity of the connected lighting load, the concepts of the present invention could also be applied load control systems having electronic switches that are only operable to toggle a connected lighting load on and off.

As described herein, the sensors 160, 162, 420 and the load control device 800 operate as occupancy sensors during the first mode of operation (i.e., during the normal mode or during the daylight hours), and operate as vacancy sensors during the second mode of operation (i.e., during the afterhours mode or during the nighttime hours). Alternatively, the sensors 160, 162, 420 and the load control device 800 could operate as vacancy sensors during the first mode of operation, and as occupancy sensors during the second mode of operation. In addition, the load control systems 100, 400 and the load control device 800 could alternatively operate to turn the lighting loads on and off in response to occupied and vacant messages, respectively, during the first mode of operation, and to turn on the lighting loads in response to occupied message, but not to turn off the lighting load in response to vacant message during the second mode of operation.

While load control systems 100, 400 and the load control device 800 of the present invention have been described as changing between the first and second modes of operation in response to the present time of the day (using an astronomical time clock), the control devices of the load control systems could use alternative means to determine the present time of the day (e.g., retrieving the present time from the Internet or monitoring the daylight level in the space using a photosensor to estimate the present time). In addition, the control devices of the load control systems of the present invention could alternatively change between the first and second modes of operation in response to actuations of one or more buttons or inputs of a keypad or other control device in the load control systems.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A load control system for controlling the amount of power delivered from an AC power source to an electrical load located in a space of a building, the load control system comprising:
   a sensor mounted to detect an occupancy condition or a vacancy condition in the space; and
   a load control device adapted to be coupled in series between the source and the load for controlling the amount of power delivered to the lighting load, the load control device responsive to the sensor to control the intensity of the lighting load;
   wherein the load control system operates as though the sensor is an occupancy sensor when the load control system is operating in a first mode of operation, defined for a first predetermined period of time, and as though the sensor is a vacancy sensor when the load control system is operating in a second mode of operation, defined for a second predetermined period of time, the load control system operable to automatically change between the first and second modes of operation in response to the present time of day.

2. The load control system of claim 1, wherein the sensor is operable to transmit digital messages to the load control device in response to detecting an occupancy condition or a vacancy condition in the space.

3. The load control system of claim 2, wherein the sensor transmits digital messages including either occupancy commands or vacancy commands to the load control device, the load control device responding to both digital messages including occupancy commands and digital messages including vacancy commands in the first mode of operation, the load control device responding to only digital messages including vacancy commands in the second mode of operation.

4. The load control system of claim 3, wherein the load control device comprises an astronomical timeclock for determining a present time of the day, such that the load control device is operable to automatically change between the first and second modes of operation in response to the present time of the day.

5. The load control system of claim 2, wherein the sensor operates in the first mode of operation to transmit digital messages including occupancy and vacancy commands to the load control device in the first mode of operation, and transmits only digital messages including vacant commands to the load control device in the second mode of operation, such that the load control device does not turn the load on when the sensor detects the occupancy condition in the second mode of operation.

6. The load control system of claim 5, wherein the load control device comprises an astronomical timeclock for determining a present time of the day, such that the load control device is operable to automatically change between the first and second modes of operation in response to the present time of the day.

7. The load control system of claim 2, wherein the electrical load comprises a lighting load, and the load control device comprises a dimmer switch for adjusting the amount of power delivered to the lighting load.

8. The load control system of claim 2, wherein the electrical load comprises a lighting load, and the load control device comprises an electronic switch for toggling the lighting load on and off.

9. The load control system of claim 1, further comprising:
a central controller operable to transmit digital messages to the load control device in response to the sensor detecting the occupancy condition or the vacancy condition in the space, the central controller operating in the first mode of operation to turn the load on when the sensor detects the occupancy condition and to turn the load off when the sensor detects the vacancy condition, and operating in the second mode of operation to turn the load off when the sensor detects the vacancy condition, the central controller not turning the load on when the sensor detects the occupancy condition in the second mode of operation.

10. The load control system of claim 9, wherein the central controller comprises an astronomical timeclock for determining a present time of the day, such that the central controller is operable to automatically change between the first and second modes of operation in response to the present time of the day.

11. The load control system of claim 9, wherein the load control device comprises a ballast for controlling the intensity of a fluorescent lamp, the ballast coupled to the central controller via a communication link for receiving the digital message from the central controller.

12. The load control system of claim 9, further comprising:
a keypad device having a button for receiving a user input, and coupled to the central controller via a communication link, the keypad device operable to transmit the digital message to the central controller in response to an actuation of the button;
wherein the central controller is operable to change between the first and second modes of operation in response to an actuation of the button of the keypad.

13. The load control system of claim 9, further comprising:
a contact-closure input device for receiving a contact-closure input from a contact-closure output device, the contact-closure input device coupled to the central controller via a communication link, the contact-closure input device operable to transmit the digital message to the central controller in response to receiving the contact-closure input;
wherein the central controller is operable to change between the first and second modes of operation in response to the contact-closure input device receiving the contact-closure input.

14. The load control system of claim 9, further comprising:
a contact-closure input device coupled to the sensor for receiving a contact-closure input from the sensor, the contact-closure input device coupled to the central controller via a communication link, the contact-closure input device operable to transmit a digital message to the central controller in response to the sensor detecting the presence or absence of the occupant in the space.

15. The load control system of claim 9, wherein the load control device comprises a ballast for controlling the intensity of a fluorescent lamp, the ballast coupled to a communication link for receiving the digital messages from the central controller, the ballast further coupled to the sensor, such that the ballast is operable to transmit digital message to the central controller in response to the sensor detecting the presence or absence of the occupant in the space.

16. The load control system of claim 9, wherein the central controller comprises an astronomical timeclock for determining a present time of the day, the central controller operable to change between the first and second modes of operation in response to the present time of the day.

17. A load control device for controlling the amount of power delivered from an AC power source to a lighting load located in a space of a building, the load control device comprising:
a load control circuit adapted to be coupled in series between the source and the load for controlling the amount of power delivered to the load;
a sensor for detecting the presence and absence of an occupant in the space; and
an internal controller operatively coupled to the load control circuit and the sensor for controlling the intensity of the load in response to the sensor, the internal controller operable to operate in first and second modes of operation, the first mode of operation being defined for a first predetermined period of time and the second mode of operation being defined for a second predetermined period of time, the internal controller operable to automatically change between the first and second modes of operation in response to the present time of day;
wherein the load control device operates as an occupancy sensor when the internal controller is operating in a first mode of operation, and as a vacancy sensor when the internal controller is operating in a second mode of operation.

18. The load control device of claim 17, wherein while the internal controller is operating in the first mode of operation, the internal controller turns the lighting load on when the sensor detects the presence of the occupant and turns the lighting load off when the sensor detects the absence of the occupant; and
wherein while the internal controller is operating in the second mode of operation, the internal controller turns the lighting load off when the sensor detects the absence of the occupant and does not turn the lighting load on when the sensor detects the presence of the occupant.

19. The load control device of claim 18, wherein the sensor comprises a passive infrared detector, the load control device further comprising a toggle actuator operatively coupled to the internal controller and a lens positioned adjacent the toggle actuator, the internal controller operable to toggle the load on and off in response to actuations of the toggle actuator, the lens operable to direct infrared energy from the occupant towards the passive infrared detector.

20. The load control device of claim 18, wherein the internal controller comprises an astronomical timeclock for determining a present time of the day, such that the internal controller is operable to automatically change between the first and second modes of operation in response to the present time of the day.

* * * * *